United States Patent
Ling et al.

(10) Patent No.: US 10,253,214 B2
(45) Date of Patent: Apr. 9, 2019

(54) METHODS FOR INHIBITING THE DEPOSITION OF ORGANIC CONTAMINATES IN PULP AND PAPERMAKING SYSTEMS

(71) Applicant: Solenis Technologies, L.P., Schaffhausen (CH)

(72) Inventors: Tien-Feng Ling, Newark, DE (US); Zhaoqing Liu, Pennington, NJ (US); Kyle J Bottorff, Newark, DE (US)

(73) Assignee: SOLENIS TECHNOLOGIES, L.P., Schaffhausen (CH)

( * ) Notice: Subject to any disclaimer, the term of this patent is extended or adjusted under 35 U.S.C. 154(b) by 153 days.

(21) Appl. No.: 15/192,188

(22) Filed: Jun. 24, 2016

(65) Prior Publication Data

US 2017/0009100 A1    Jan. 12, 2017

Related U.S. Application Data

(60) Provisional application No. 62/189,397, filed on Jul. 7, 2015.

(51) Int. Cl.
*C09D 197/00* (2006.01)
*D21C 9/08* (2006.01)
*D21H 21/04* (2006.01)
*C09D 171/02* (2006.01)

(52) U.S. Cl.
CPC ....... *C09D 197/005* (2013.01); *C09D 171/02* (2013.01); *D21C 9/08* (2013.01); *D21H 21/04* (2013.01)

(58) Field of Classification Search
None
See application file for complete search history.

(56) References Cited

U.S. PATENT DOCUMENTS

| | | |
|---|---|---|
| 3,398,047 A | 8/1968 | Michalski |
| 3,639,263 A | 2/1972 | Troscinski et al. |
| 3,795,665 A | 3/1974 | Ludwig |
| 3,829,388 A | 8/1974 | Lange et al. |
| 3,869,309 A | 3/1975 | Fonne et al. |
| 3,912,706 A | 10/1975 | Rachor et al. |
| 3,956,261 A | 5/1976 | Lin |
| 4,190,491 A | 2/1980 | Drennen et al. |
| 4,221,708 A | 9/1980 | Lin |
| 4,308,203 A | 12/1981 | Lin |
| 4,313,790 A * | 2/1982 | Pelton ............... D21H 17/23 162/163 |
| 4,326,962 A | 4/1982 | Jones et al. |
| 4,444,562 A | 4/1984 | Lin |
| 4,521,336 A | 6/1985 | Dilling |
| 4,551,151 A | 11/1985 | Dilling |
| 4,710,267 A | 12/1987 | Elsby et al. |
| 4,744,865 A * | 5/1988 | Dreisbach ............ D21H 21/02 162/168.1 |
| 4,765,867 A | 8/1988 | Dreisbach et al. |
| 4,775,744 A | 10/1988 | Schilling et al. |
| 4,846,933 A | 7/1989 | Dreisbach et al. |
| 4,871,424 A | 10/1989 | Dreisbach et al. |
| 4,886,575 A | 12/1989 | Moreland |
| 4,892,589 A | 1/1990 | Kirkland et al. |
| 4,918,167 A | 5/1990 | Glasser et al. |
| 4,956,051 A | 9/1990 | Moreland |
| 4,995,944 A | 2/1991 | Aston et al. |
| 5,066,790 A | 11/1991 | Glasser et al. |
| 5,074,961 A | 12/1991 | Dreisbach et al. |
| 5,102,992 A | 5/1992 | Glasser et al. |
| 5,131,982 A | 7/1992 | St. John |
| 5,139,616 A | 8/1992 | Ling |
| 5,223,097 A | 6/1993 | Hassler |
| 5,230,814 A | 7/1993 | Naae et al. |
| 5,246,548 A | 9/1993 | Aston et al. |
| 5,266,166 A | 11/1993 | Dreisbach et al. |
| 5,292,403 A | 3/1994 | Dreisbach et al. |
| 5,300,194 A | 4/1994 | Welkener et al. |
| 5,368,694 A | 11/1994 | Rohlf et al. |
| 5,393,380 A | 2/1995 | Reed et al. |
| 5,536,363 A | 7/1996 | Nguyen |
| 5,556,510 A | 9/1996 | Dreisbach et al. |
| 5,626,720 A | 5/1997 | Hassler |
| 5,656,177 A | 8/1997 | Werres |
| 5,723,021 A * | 3/1998 | Nguyen ............... D21C 5/022 162/168.1 |
| 5,746,888 A | 5/1998 | Nguyen et al. |
| 5,749,926 A | 5/1998 | Dilling et al. |
| 5,762,757 A | 6/1998 | Nguyen et al. |

(Continued)

FOREIGN PATENT DOCUMENTS

| | | |
|---|---|---|
| CN | 103755972 | 4/2014 |
| DE | 10017012 A | 9/2001 |

(Continued)

OTHER PUBLICATIONS

International Search Report, dated Oct. 10, 2016, PCTUS2016/039294, pp. 2.

(Continued)

*Primary Examiner* — Michael P. Rodriguez

(74) *Attorney, Agent, or Firm* — Lorenz & Kopf, LLP

(57) ABSTRACT

The current method relates to compositions and methods for inhibiting the deposition of organic contaminants in pulp and papermaking systems. The current method also relates to controlling the deposition of organic contaminants on equipment in the pulp and papermaking systems, which can cause both quality and efficiency problems. In particular the method relates to the use of non-sulfonated or slightly sulfonated lignin dispersions and solutions for inhibiting deposition of contaminants in pulp and paper making system.

20 Claims, No Drawings

(56) References Cited

U.S. PATENT DOCUMENTS

| | | |
|---|---|---|
| 5,779,858 A | 7/1998 | Nguyen |
| 5,837,100 A | 11/1998 | Gerli et al. |
| 5,863,385 A | 1/1999 | Siebott et al. |
| 5,866,618 A | 2/1999 | Nguyen |
| 5,885,419 A | 3/1999 | Nguyen et al. |
| 5,925,743 A | 7/1999 | Detroit |
| 5,952,394 A | 9/1999 | Nguyen |
| 5,972,047 A | 10/1999 | Dilling et al. |
| 5,980,589 A | 11/1999 | Dilling et al. |
| 5,989,392 A | 11/1999 | Tang et al. |
| 6,051,160 A | 5/2000 | Hlivka et al. |
| 6,100,385 A | 8/2000 | Naae et al. |
| 6,143,800 A | 11/2000 | Nguyen et al. |
| 6,207,808 B1 | 3/2001 | Naae et al. |
| 6,280,855 B1 | 8/2001 | Viikari et al. |
| 6,369,010 B1 | 5/2002 | Dreisbach et al. |
| 6,461,477 B1 | 10/2002 | Nguyen et al. |
| 6,517,682 B2 | 2/2003 | Hendriks et al. |
| 6,593,460 B1 | 7/2003 | Huttermann et al. |
| 6,689,737 B2 | 2/2004 | Scheibel |
| 7,407,561 B2 | 8/2008 | Song et al. |
| 7,534,324 B2 | 5/2009 | Pease et al. |
| 7,691,982 B2 | 5/2010 | Tomita et al. |
| 7,771,749 B2 | 8/2010 | Asrar et al. |
| 8,075,637 B2 | 12/2011 | Gizaw et al. |
| 8,288,460 B2 | 10/2012 | Balakshin et al. |
| 8,378,020 B1 | 2/2013 | Balakshin et al. |
| 8,388,806 B2 * | 3/2013 | Gu .................. C08G 65/22 162/158 |
| 8,426,502 B2 | 5/2013 | Balakshin |
| 8,431,635 B2 | 5/2013 | Balakshin et al. |
| 8,445,562 B2 | 5/2013 | Balakshin et al. |
| 8,696,865 B2 | 5/2014 | Balakshin et al. |
| 8,765,846 B2 | 7/2014 | Balakshin et al. |
| 2002/0096293 A1 | 7/2002 | Nguyen et al. |
| 2003/0156970 A1 * | 8/2003 | Oberkofler ........... C02F 1/50 422/7 |
| 2010/0166968 A1 * | 7/2010 | Doherty ........... D21H 17/23 427/387 |
| 2011/0011546 A1 | 1/2011 | Rintala et al. |
| 2013/0180927 A1 | 7/2013 | Dong et al. |
| 2015/0166836 A1 | 6/2015 | Liu et al. |

FOREIGN PATENT DOCUMENTS

| | | |
|---|---|---|
| EP | 0058622 | 2/1982 |
| EP | 0464993 | 9/1991 |
| EP | 0731776 | 11/1994 |
| EP | 0828889 | 5/1996 |
| ES | 2148325 T3 | 10/2000 |
| WO | 200034581 | 6/2000 |
| WO | 200188264 | 11/2011 |
| WO | 2012022451 | 2/2012 |

OTHER PUBLICATIONS

Chilean Patent Office, First Office Action issued in Chilean Patent Application No. 00030-2018 dated Dec. 19, 2018.

* cited by examiner

METHODS FOR INHIBITING THE DEPOSITION OF ORGANIC CONTAMINATES IN PULP AND PAPERMAKING SYSTEMS

This application claims the benefit of U.S. provisional application No. 62/189,397, filed 7 Jul. 2015, the entire contents of which are hereby incorporated by reference.

BACKGROUND OF THE INVENTION

This invention relates to compositions and methods for inhibiting the deposition of organic contaminants in pulp and papermaking systems. The current method also relates to controlling the deposition of organic contaminants on equipment in the pulp and papermaking systems, which can cause both quality and efficiency problems. Organic contaminants found in pulp and paper systems are diverse mixtures containing pitch, stickies, and papermaking additives. The term "pitch" can be used to refer to deposits composed of organic constituents originated from natural wood resins, such as fatty acids, resin acids, esters of fatty acids, glycerols, sterols, and other fats and waxes. Pitch deposits usually form from microscopic particles of tacky, hydrophobic material in the stock which accumulate on pulp or papermaking equipment. These deposits can be found on, for example, stock chest walls, paper machine foils, machine wires, Uhle boxes, press felts, roll surfaces, dryer felts, dryer cans, and calendar stacks.

Stickies is a term that has been used to describe deposits that occur in systems using recycled fiber. These stickies deposits often contain the same materials found in "pitch" deposits as well as adhesives, hot melts, waxes, inks, binders, coatings, etc. Papermaking additives, such as defoamers, sizing agents, coating binders, solvents, strength agents, fillers, and other additives, are also often found in stickies deposits. These deposits tend to cause many of the same difficulties that pitch deposits can cause. The most severe stickies deposits tend to be found on stock chest walls, paper machine wires, wet felts, roll surfaces, dryer felts, and dryer cans. Either pitch or stickies deposits can impact machine runnability (e.g., reduced production yield) and paper quality (e.g., holes, dirt, sheet defects, inferior converting/printability, etc.).

All of the aforementioned organic materials have many common characteristics including: hydrophobicity, tackiness, deformability, relatively low surface energy, and a tendency to agglomerate. These characteristics contribute pitch and stickies agglomeration and machine deposition. To stabilize these pitch and/or stickies particles in the pulp slurry, one of the methods is to use a chemical to create a stabilization barrier around them. This barrier (i.e., protective layer) renders the particles with higher hydrophilicity and lower tackiness. The modified pitch and/or stickies particles have a less tendency to deposit onto the paper machine surface.

Methods of preventing the build-up of deposits on the pulp and paper mill equipment and surfaces are of great importance to the industry. The paper machines could be shut down for cleaning, but ceasing operation for cleaning is undesirable because of the consequential loss of productivity. Poor paper quality occurs when deposits break off and become incorporated in the sheet. Preventing deposition is thus greatly preferred where it can be effectively practiced. Chemical treatment techniques for organic contaminants control include dispersion, detackification, cationic fixation, wire passivation, and solvent cleaning. These methods, however, are not commonly used together since they may conflict with each other.

In dispersion technology, dispersants such as surfactants and water-soluble polymers, are used to chemically enhance colloidal stability of pitch and stickies particles in pulp. This function allows pitch and stickies to pass through the papermaking process without agglomerating or depositing. Examples of related art include U.S. Pat. Nos. 4,744,865, 5,139,616, 6,051,160, and 6,369,010.

In detackification technology, surface-active water-soluble polymers, surfactants, or inorganic compounds (e.g., talc and bentonite) are used to form a protective layer around the pitch and stickies particle surfaces to reduce their tackiness and depositability. U.S. Pat. Nos. 4,744,865; 4,846,933; 4,871,424; 4,886,575; 5,074,961; 5,266,166; 5,292,403; 5,393,380; 5,536,363; 5,556,510; 5,885,419; 5,723,021; 5,746,888; 5,762,757; 5,779,858; 5,866,618; 5,885,419; 5,952,394; 6,143,800; 6,461,477; and WO 2001/088264 A2, describe the use of water-soluble polymers, surfactants, or inorganic compounds as detackification agents for pitch and stickies control.

Water-soluble polymers are often used for cationic fixation. Examples of water-soluble polymers include polyamines, polyDADMAC, polyacrylamides, polyvinylamines, polyethylenimines, and polyacrylamide polyDADMAC copolymers. These polymers are generally cationic in nature and readily interact with the negatively charged colloidal particles to remove them from the pulp and paper system by "fixation" to the wood fibers in the paper. U.S. Pat. Nos. 4,190,491; 4,710,267; 4,765,867; 5,131,982; 5,393,380; 5,837,100; 5,989,392; and 7,407,561; European Application Nos. EP 464993 and EP 058622, and WO 2000/034581A1 disclose fixation-related technology for contaminants control.

For wire, felt, and dryer fabric passivation, conventional practices include treating machine wire with cationic water-soluble polymers to form a protective layer on wire and felt surfaces. For dryer fabric passivation, a common practice is to apply a chemical treatment that makes a fabric surface more hydrophobic than an untreated surface. This protective layer prevents organic contaminants from deposition. Nonionic water-soluble polymers are also found to be effective in wire and felt passivation applications. The following references are examples of this type of technology: U.S. Pat. Nos. 4,956,051; 4,995,944; 5,223,097; 5,246,548; 5,300,194; 5,368,694; 5,626,720; 5,723,021; 5,762,757; 5,952,394; 6,517,682; and 7,534,324.

Solvent-based cleaning is a common mean to clean organic deposits on paper machine surfaces. Solvents or solvents blended with surfactants are typical materials used for this application. Usually, solvent based cleaning products are not compatible with dispersants, detackifiers, cationic fixatives, or wire passivation agents due to their functionalities and mechanisms. References related to this technology are disclosed in U.S. Pat. Nos. 5,656,177; 5,863,385 and 6,369,010; WO 2012/022451; and European Application Nos. EP 731776 and EP 828889.

Lignin-based Compound: Lignosulfonates

Lignosulfonates are well known pitch dispersants (U.S. Pat. No. 3,398,047). They also can act as emulsion stabilizers. Some advantages are to use lignosulfonates to enhance emulsion stability under salt contamination, mechanical stress, and temperature variations that occur in the typical processes of use. For instance, lignosulfonates are used in a variety of wax/water and oil/water emulsions for applications varying from paper sizing to asphalt stabilization. Another application for lignosulfonates is its use in alkaline or acid industrial cleaners. They function as dispersants for dirt particles, as mild surfactants for improved rinsing, and as complexing agents for metal ions. In water treatment applications, lignosulfonates are used as dispersants and scale-deposit inhibitors in boilers and cooling towers. Spent sulfite liquor containing lignosulfonates and sugar acid salts can also be used to control slime in the paper making process.

Historically, lignosulfonates and other lignin based products have been used in the traditional industries such as oil drilling additives, dust control, concrete additives, asphalt-emulsifying agent, dyestuff dispersants, agricultural chemicals, animal feed, and industrial binders. Advances in lignin technology, however, have led to the development of specialty products that can compete with higher cost synthetics. Examples of these advanced uses include the paper industry, enzyme protection, neutralization of biocides, precious metal recovery aids, and wood preservation. The improved performance of these products together with the fact that they are essentially non-toxic and derived from a renewable resource make them versatile, cost-effective chemicals for today's environmentally conscious consumer.

Commercial lignosulfonates are complex anionic polymers obtained as co-products of wood pulping. They are obtained from spent sulfite pulping liquor or from postsulfonation of kraft (i.e., sulfate) lignins. For some applications, spent sulfite liquors containing crude lignosulfonate are used without further modification. For most specialty applications, however, impurities negatively impact performance and purification and/or modification is required. Purification methods include sugar removal by fermentation or chemical destruction. Ultrafiltration and chemical precipitation are also used commercially to produce high purity lignosulfonates. Chemical modifications include: sulfonation, sulfoalkylation, desulfonation, formulation, oxidation, carboxylation, amination, crosslinking, depolymerization, graft polymerization, and combinations of the above. Chemical modifications are generally performed to enhance the dispersing, complexing, or binding properties of the finished products.

Sodium lignosulfonate and its derivatives can be used for preventing pitch deposition in papermaking systems (U.S. Pat. Nos. 3,398,047 and 4,313,790). Naphthalene sulfonate formaldehyde or lignin sulfonate formaldehyde condensate can be used for controlling stickies and pitch deposition on paper machine surfaces (US Pat. App. 2011/0011546).

Lignin adducts, such as lignosulfonate, lignodicarboxylic acids, oxidized lignin-formaldehyde, sulfomethylated lignin, and methylol hydroxybenzene with sulfonated lignin derivatives, are used as dispersants (U.S. Pat. Nos. 3,956,261; 4,221,708; 4,308,203; 4,326,962; 4,444,562; 4,521,336; 4,551,151; 5,749,926; 5,925,743; 5,972,047; 5,980,589; 7,691,982; 2003/0193554; etc.).

Cyanohydrinated lignosulfonate is used as a corrosion inhibitor (U.S. Pat. No. 3,639,263). Polyoxyalkylene lignin compounds are used as thickeners and flocculants (U.S. Pat. Nos. 3,795,665 and 3,912,706).

Lignin derivatives combined with polyvalent cations (e.g., $Ca^{+2}$, $Mg^{+2}$, $Al^{+3}$, etc.) can be used for scale control in cooling water system (U.S. Pat. No. 3,829,388). Alkali lignosulfonate can be used as an antiskid (U.S. Pat. No. 3,869,309).

Lignin amines are used as flocculants, coagulants, scale inhibitors, corrosion inhibitors, tall oil pitch emulsifiers, retention aids, etc. (U.S. Pat. No. 4,775,744 and 2013/0180927). Lignin-based epoxy resin polymers are used for applications such as fertilizers, ion exchange resins, polyurethane, etc. (U.S. Pat. Nos. 4,918,167, 5,066,790 and 5,102,992).

Sulfonated lignin phenol surfactants are commonly used in oil recovery with surfactant flooding (U.S. Pat. Nos. 5,230,814, 6,100,385 and 6,207,808).

Modified lignin polymers, such as amino-substituted lignin phenols, alkoxy-substituted lignin phenols and alkylated lignosulfonate surfactants, can be used as household cleaning agent or detergent (U.S. Pat. Nos. 6,689,737, 8,075,637, and CN103755972).

Enzyme-catalyzed lignin or lignin sulfonate compounds are used as wood binding agent (U.S. Pat. No. 6,280,855) and water absorbers, coagulants, water softeners, etc. (U.S. Pat. No. 6,593,460).

Lignin derivatives with an aliphatic hydroxyl content less than about 2.35 millimole per gram (mmol/g), are used as antioxidants for thermoplastic polymer, nutritional supplement, animal feed, or functional food (U.S. Pat. Nos. 8,288,460, 8,378,020, 8,426,502, 8,431,635, 8,445,562, 8,696,865 and 8,765,846).

Carboxylated, phosphonated, or nitrated sulphur-free lignin are used together with complexing agents (e.g., polyasparaginate) for slime and deposit control in industrial water processes (US Pat. App. 2003/0156970).

Lignin acetate is used to produce pesticides, herbicides, and plant regulating chemicals for the control release of an agricultural active (U.S. Pat. No. 7,771,749).

SUMMARY

The method relates to preventing and/or inhibiting the deposition of organic contaminants on paper machine surfaces in pulp and papermaking processes wherein one or more non-sulfonated or slightly sulfonated lignin and optionally one or more hydrophobically modified water-soluble polymer and/or one or more cationic or anionic charged compound is added to the papermaking system or combinations thereof.

The term "non-sulfonated lignin" refers to a lignin dispersion or lignin solution, which does not contain $SO_3^{-2}$ or $SO_4^{-2}$ functional groups. The lignin dispersion consists of lignin particles with a size less than 20 microns.

Slightly sulfonated lignin is a lignin polymer that possesses desirable amount of sulfonic acid groups interacted with its aliphatic chain or aromatic nucleus site or both sites. The degree of sulfonation, expressed as moles of organically bound sulfur per kilogram of lignin, is a function of the amount of organically bound sulfur present in the product. Organically bound sulfur is calculated from the total sulfur content minus the sum of the amount of sulfur present in the starting lignin and the sulfur present in the free salts. For example, Lignosol™XD has a degree of sulfonation of about 4.2 moles of sulfur per kilogram of lignin.

The method also relates to preventing and/or inhibiting the deposition of contaminants on the surfaces of papermaking machinery and equipment comprising spraying one or more non-sulfonated or slightly sulfonated lignin and optionally one or more hydrophobically modified water-soluble polymer and/or one or more cationically or anionically charged compound.

The present invention relates to compositions and methods for inhibiting the deposition of organic contaminants from pulp on the surfaces of papermaking machinery in pulp and papermaking systems. This comprises adding a non-sulfonated or slightly sulfonated lignin composition to the papermaking pulp or spraying the composition onto the surfaces of the papermaking machinery in an effective amount. An effective amount would vary from one papermaking process to the next due to the dynamics of the pulping and papermaking process.

The present method also relates to compositions and methods for inhibiting the deposition of organic contaminants from pulp on the surfaces of papermaking machinery in pulp and papermaking system comprising adding to the pulp or spraying onto the surfaces of the papermaking machinery an effective amount of a composition comprising one or more non-sulfonated lignin and one or more hydrophobically modified water-soluble polymer and/or one or more cationic or anionic charged compound.

Lignin, the second most abundant renewable natural resource next to cellulose, is a highly-branched, three dimensional biopolymer. The major chemical functional groups in lignin include hydroxyl, methoxyl, carbonyl, and carboxyl groups in various amounts and proportions, depending on genetic origin and applied extraction processes.

BioChoice™ lignin, a by-product of the kraft pulping process, is produced by Domtar's biorefinery in Plymouth, N.C. This mill installed Valmet's patented LignoBoost™ (US Pat. Appl. 20140219909) technology (Innventia B, Stockholm, Sweden). When the lignin is extracted, the load on the recovery boiler is lowered, enabling increased pulp production. For example, by removing 25% of the lignin in the black liquor, the boiler capacity can be increased to allow 20-25% more pulp production. LignoBoost™ gives pulp mills new potential to increase production, reduces costs, and create new sources of income. A similar commercial isolated lignin product, LignoForce™, was produced by FP Innovations (U.S. Pat. No. 8,940,130 B2).

BioChoice™ lignin is a bio-based alternative to petroleum and other fossil fuels. There are a wide range of potential applications for BioChoice™ lignin, including in the energy, materials, and chemicals categories: adhesives, agricultural chemicals, carbon products (e.g., carbon fiber, graphite and activated carbon), coatings, antioxidant, dispersants, fuels and fuel additives, natural binders, battery enhancers, and resins. In the automotive industry, BioChoice™ lignin has demonstrated huge potential for producing carbon fiber reinforced plastics (CFRP).

The aforementioned references do not teach the use of non-sulfonated or slightly sulfonated lignin (i.e., lignin dispersion or lignin solution) in pulp and papermaking processes. Nor do the references teach or disclose that non-sulfonated or slightly sulfonated lignin can be blended with hydrophobically modified water-soluble polymers, cationically or anionically charged polymers, enzymes, or emulsions resulting in preventing, cleaning or inhibiting the deposition of contaminants in pulp and papermaking processes. Through the present method it was discovered that a combination of non-sulfonated lignin dispersion (or lignin solution) and hydrophobically modified water-soluble polymers and/or cationic and anionic charged polymers have a synergistic effect on preventing and/or inhibiting organic deposits. A synergistic effect was also see when two or more slightly sulfonated lignins were combined together. The current compositions can be used for detackification, dispersion, wire/felt passivation, roll release, and biofilm inhibition in the pulp and papermaking systems.

A lignin solution can be identified by the following criteria:
(1) Greater than 85 wt % of lignin (by dry weight) pass through a 100 nm centrifuge filter when using a 5 wt % lignin (by dry weight) solution with an Eppendorf Centrifuge 5430 from Eppendorf North America (Hauppauge, N.Y.) equipped with a FA-45-48 rotor at a fixed angle at 9000 rpm.
(2) A 0.01 wt % concentration results in a signal intensity less than 85 kilocounts per second, using a ZetaPlus instrument from Brookhaven Instrument Corporation (Holtsvill, N.Y.) at the setting of Ref Index Fluid is n1.1330; Angle is 90; Wavelength is 658 nm; Run Duration is 5 min; Ref. Index Real is 1.600; and Dust Filter Setting is 30.00.

In contrast, the following criteria are established in order to differentiate lignin dispersions from lignin solutions.
(1) A lignin dispersion should have less than 85 wt % of lignin (by dry weight) passes through a 100 nm centrifuge filter when using a 5 wt % lignin (by dry weight) dispersion under the conditions described above.
(2) A 0.01 wt % lignin concentration results in an "effective particle size" between 20 nanometer (nm) and 5000 nm, and a signal intensity greater than 85 kilo counts per second (kcps) using the settings and particle size instrument described above.
(3) The dispersion is stable and homogenous and does not separate for at least four days. NMR analysis showed that lignin dispersions did not show any change in molecular weight distribution and polydispersity compared to the original lignin particles.

Lignin dispersion-polymer complex has a high affinity to adsorb onto a substrate, such as glass, stainless steel, ceramic, polypropylene, and aluminum, to impart rinse resistant properties to the substrate. The rinse resistant properties include hydrophilicity, hydrophobicity, antimicrobial, UV-protection, anti-oxidation, anti-soiling, and combinations thereof.

Each reference cited in the present application, including books, patents, published applications, journal articles and other publications, are incorporated herein by reference in their entirety.

DETAILED DESCRIPTION OF THE INVENTION

In one aspect of the current method, there is a dispersion or solution of one or more non-sulfonated lignin and optionally one or more hydrophobically modified water-soluble polymer that prevents and/or inhibits the deposition of stickies and pitch contaminants on surfaces in pulp and papermaking processes. The term "non-sulfonated lignin" refers to the lignin dispersion or lignin solutions some of which are described in US Pat. Appl. 2014/07119 and are herein incorporated in their entirety by reference.

In other aspects of the current method, the dispersion or solution comprises one or more slightly sulfonated lignin and optionally a hydrophobically modified water-soluble polymer that prevents and/or inhibits the deposition of stickies and pitch contaminants on surfaces in pulp and papermaking processes. Slightly sulfonated lignin is a lignin polymer that possesses desirable amount of sulfonic acid groups interacted with its aliphatic chain or aromatic nucleus site or both sites. The degree of sulfonation, expressed as moles of organically bound sulfur per kilogram of lignin, is a function of the amount of organically bound sulfur present in the product. Organically bound sulfur is calculated from the total sulfur content minus the sum of the amount of sulfur present in the starting lignin and the sulfur present in the free salts.

In some aspects of the above methods, the dispersion or solution comprises one or more slightly sulfonated lignin wherein the degree of sulfonation of the slightly sulfonated lignin of the dispersion or solution is less than 3.5 moles of sulfur per kilogram of lignin and can be from about 0.1 to 1.5 moles of sulfur per kilogram of lignin.

In other aspects, lignin solutions can be easily prepared by heating and mixing lignin in water at a pH of 9.5 or above. For non-sulfonated lignin, the lignin dispersion can be prepared at a pH higher than 8.0. The specific pH varies with the type and source of lignin.

In some aspects of the current method, the optional hydrophobically modified water-soluble polymers (HM-WSP) can be prepared by chemically incorporating hydrophobe(s) onto a hydrophilic portion of the polymer. The following hydrophobically modified water-soluble polymers, i.e., HMWSP-1 and HMWSP-4 are typical examples.

HMWSP-1 consists of water-soluble nonionic hydrophobically modified hydroxyethyl cellulose, which contains $C_{16}$ alkyl group and has a hydroxyethyl molar substitution of about 1.5 to about 4.0 (moles of hydroxyethyl per anhydroglucose unit in cellulose). The HMWSP-1 polymer has a viscosity in a 1% aqueous solution of about 300 centipoise (cps) to about 500 cps at ambient temperature. Where viscosity is used in this application, it was determined using a Brookfield Viscometer, Model No. DV-II+ using a #3 spindle at 30 rpm and 25° C.

Other polysaccharides that may be used in combination with HMWSP-1 are carboxymethyl cellulose, hydroxypropyl cellulose, methyl cellulose, methyl hydroxyethyl cellulose, carboxymethyl hydroxyethyl cellulose, hydroxypropyl methyl cellulose, ethyl hydroxyethyl cellulose, guar, hydroxypropyl guar, carboxymethyl guar, xanthan gum, and acrylamide copolymers. The composition and preparation of HMWSP-1 is described by Kirkland in U.S. Pat. No. 4,892,589, which is incorporated herein by reference in its entirety.

HMWSP-2 is a hydrophobically modified water-soluble methyl cellulose with a molecular weight of about 86,000. As disclosed in U.S. Pat. No. 5,074,961, water-soluble cellulose ether can be selected from methyl cellulose, methyl hydroxyethyl cellulose, methyl hydroxypropyl cellulose, carboxymethyl methyl cellulose, and methyl hydroxybutyl methyl cellulose. This patent is incorporated herein by reference in its entirety.

HMWSP-3 is a polyvinyl alcohol having from about 50% to about 99% hydrolysis and can have from about 80% to about 90% hydrolysis. HMWSP-3 has a molecular weight of from about 90,000 to about 150,000. U.S. Pat. Nos. 4,744,865 and 4,871,424 describe the composition and application of HMWSP-3 and is herein incorporated in their entirety. Other compounds that may be used in combination with HMWSP-3 include gelatins and/or anionic or cationic polymers (see U.S. Pat. Nos. 5,536,363; 5,723,021; and 5,952,394).

HMWSP-4 is a hydrophobically modified polyethylene glycol, made by the reaction of polyethylene glycol with alkyl glycidyl ether, as disclosed in U.S. Pat. No. 8,388,806 B2, which is incorporated herein by reference in its entirety.

Hydrophobically modified polymers are typically used as thickeners, commonly known as hydrophobically modified alkali-swellable emulsions (RASE), and hydrophobically modified ethylene oxide-urethane block copolymers (HURE) and hydrophobically modified polyethers (HMPE) under Aquaflow® trade name.

In some aspects of the current method, the hydrophobically modified water-soluble polymers may also have synergistic effect when combining with lignin dispersion or lignin solution described above. These polymers can include whey protein, wheat protein, soy protein, ovalbumin, serum, lactoglobulin, casein, albumin, globulin, gelatin, collagen, polyoxyalkylene block copolymers, poly(aminoamides) modified with alkyl glycidyl ether, alkylketene dimer, alkylsuccinyl anhydride, or 3-chloro-2-hydroxypropyl-N,N,N-dimethylalkyl ammonium chloride, polydimethyl siloxane, diisobutylene maleic anhydride copolymer, polyvinylpyrrolidone, alkylated polyvinylpyrrolidone, vinylpyrrolidone dimethyl aminoethyl methacrylate copolymer, vinyl caprolactan vinylpyrrolidone dimethylaminoethyl methacrylate terpolymer, silicone polyethers, ethylene oxide/propylene oxide block copolymer, polyvinyl acetate, oxirane [[(2-ethylhexyl)oxy]methyl] derivatives with polyethylene glycol, polyethyleneterephthalate-polyethyleneglycol copolymer, polyurethane, methyl vinyl ether/maleic anhydride copolymer, polyacrylamides, β-cyclodextrin, polymethylmethacrylate, copolymer of DADMAC and acrylic acid salts, N-methyl-, polymer with (chloromethyl) oxirane, polyacrylates, diisobutylene-hydrolyzed maleic anhydride copolymers, ethyl vinyl ether/maleic anhydride copolymers, polyacrylamides, and polymethylmethacrylate, and combinations thereof.

In yet other aspects of the current method, when lignin dispersions (or lignin solutions) are combined with enzymes, such as lipases, esterases, cellulases, amylases, xylanases, pectinases, catalases, proteases, laccases, hemicellulases, carboxymethylcellulases, endoglucanases, etc., there may be exhibited multifunctional properties for pulp and papermaking applications.

In other aspects of the current method, the lignin dispersions (or lignin solutions) may be incorporated into an "aqueous cleansing emulsion" for removal and prevention of organic deposits. The aqueous cleansing emulsion includes a "cleansing emulsion" and a water-soluble and/or water-dispersible lignin. The term "cleansing emulsion" refers to the emulsion comprising of (a) at least one hydrophobic component, such as aliphatic $C_6$-$C_{40}$ hydrocarbons; aliphatic $C_{10}$-$C_{15}$ terpene hydrocarbons; aliphatic $C_{10}$-$C_{15}$ terpenoids; aromatic $C_{10}$-$C_{15}$ terpenoids; $C_6$-$C_{30}$ carboxylic acid $C_1$-$C_{30}$ alkyl esters, including vegetable oils, such as soybean oil, coconut oil, canola oil and or derivatives thereof, for example methyl esters. The hydrophobic component can also comprise essential oils, such as neem oil, thyme oil, eucalyptus oil, β-pinen, etc. The hydrophobic component can also include 1-methyl-4-isopropenyl-1-cyclohexene; acetyltriethyl citrate; tri-n-alkyl citrate; acetyltri-n-alkyl citrate; n-butyryltri-n-alkyl citrate; propylene glycol ethers; ethylene glycol ethers; propylene glycol ether acetates; ethylene glycol ether acetates; and carboxylic ester, such as butyl acetate, 2-ethylhexyl acetate, etc.; linear C18 alpha olefin (1-octadecene); dimethyl adipate; dimethyl succinate; dimethyl glutarate; fatty acid methyl ester; 2-(4-methylcyclo-3-hexenyl)-2-propanol; ethyl hydroxy propionate (or ethyl lactate); and alkyl lactate, such as methyl lactate, ethyl lactate, isopropyl lactate, butyl lactate, etc.; dibutyl adipate; dialkyl ketone; dimethyl sulfoxide; N,N-dimethyl formamide and combinations thereof; and (b) at least one emulsifier having an HLB value of from about 2 to about 16.

In yet other aspects of the current method, the lignin solution or lignin dispersion are anionic biopolymers. It is expected that soluble lignin or lignin particles have interactions with cationic compounds, such as cationic surfactants, cationic polymers, and polyvalent metal ions (e.g., $Ca^{+2}$, $Mg^{+2}$, $Al^{+3}$, $Fe^{+3}$, etc.) to form detackifying complexes. U.S. Pat. No. 5,292,403 teaches a method of inhibiting the deposition of organic contaminants in a pulp and papermaking system by adding to the system an effective amount of a detackifying composition comprising an anionic polymer and cationic surfactant. The anionic polymer can be selected from the group consisting of carboxymethyl cellulose, carboxymethylated starch, xanthan gum, guar gum, and polyacrylic acid and combinations thereof. The cationic surfactant can be selected from alkyltrimethyl amine, alkyl imidazoline, dialkyl dimethyl quaternary, imidazoline quaternary, diamidoamine quaternary, alkyl dimethyl benzyl ammonium chloride, fatty amine carboxylate, alkyldimethyl betaine, imidazoline derived propionate and acetate, phosphorylated imidazoline, and combinations thereof.

In some aspects, the cationic polymers, cationic surfactants, or polyvalent metal ions can be physically or chemically bonded to the non-sulfonated or slightly sulfonated lignin or the lignin particles.

In some aspects, the composition comprises two or more slightly sulfonated lignins wherein the slightly sulfonated lignin dispersions or solutions have a degree of sulfonation of less than 3.5 moles of sulfur per kilogram of lignin and can be from about 0.1 to about 2.0 moles of sulfur per kilogram of lignin.

In other aspects, the current composition can be added to the pulp. The composition can be fed undiluted or in various ratios with water. This type of treatment can inhibit and/or prevent the deposition of contaminants from resinous pulps and recycled pulps on machinery in the pulp/stock preparation process.

In other aspects of the current method, the non-sulfonated lignin or slightly sulfonated lignin compositions disclosed above can be added to the pulp and papermaking system in amounts of from about 0.005% to about 5.0% based on dry weight of pulp, and can be 0.01% to about 1.0% based on dry weight of pulp.

In yet other aspects, for preventing and/or inhibiting the deposition of contaminants from pulp on the surfaces of papermaking machinery, the current composition can be sprayed onto the surfaces, either undiluted or diluted with water at desirable ratios and can be a ratio of about 1:100 to about 1:1 of product to water.

In other aspects, for system cleaning, the current composition can be added to the circuit water. To prevent and/or inhibit organic deposition, the composition can be used with a boil-out cleaner. In practice, the composition can be diluted with white water or shower water. In treating white water systems, the composition can be added to the system to prevent and/or inhibit the deposition of organic contaminants on paper machine parts.

In other aspects, in the case of forming wire and felt passivation, the current composition can be diluted with spraying/shower water and sprayed directly onto the fabric surfaces. The treatment with the composition forms a protective layer on the wire and felt surfaces that prevents and inhibits the deposition of organic contaminants. For press roll passivation, the composition can be applied to the roll surface to avoid too much release strength from the central press roll.

The following examples are provided to illustrate the production and activity of representative of the present teachings and to illustrate their efficacy in the inhibition and prevention of deposit formation. One skilled in the art will appreciate that although specific compounds and conditions are outlined in the following examples, these compounds and conditions are not a limitation on the present teachings.

EXAMPLES

Example 1

Preparation of Lignin Dispersions

A lignin dispersion according to the current method was made using 60.23 parts BioChoice™ (Domtar Inc., Montreal, QC) kraft lignin of about 27% moisture, mixed with 2.98 parts potassium carbonate in 99.88 parts water. The mixture was heated to reflux, while stirring, until a homogenous liquid dispersion was obtained. While heating to reflux, it was observed that the mixture turned from a grayish suspension to a viscous black liquid at around 80° C. indicating the initial formation of a lignin dispersion. After cooling to about 70° C., the dispersion was diluted with cold water. The dispersion was clear, free from particular material, having a pH of 8.3. The lignin particles were present in the dispersion at a concentration of about 25 wt %, as measured on a moisture balance at 100° C. until a constant weight was reached. The particle size of the lignin dispersions were determined to be in the range of about 40 nanometer (nm) to about 100 nm. Various lignin dispersions with different particle size distributions can be made by using different lignin sources and/or processing conditions. Additional details are described in US Pat. Appl. 2014/07119.

Example 2

Standard Tape Detackification Test

In order to establish the efficacy of the inventive composition as deposition control agents on polyester surface and specifically for adhesive contaminants of the sort found in recycled fiber, a lab test was developed utilizing adhesive-backed tapes as stickies coupons. The stickies coupon can be fabricated from any type of adhesive tape that will not disintegrate when placed in water. For this study, tapes made from a styrene polymer, polyisoprene, and vinyl esters were used. A second coupon was fabricated from polyester film such as Mylar™, a product made by Ridout Plastics. This material was chosen because paper machine forming wires are frequently made of polyester which is susceptible to considerable deposition problems caused by stickies and/or pitch.

This test involved immersing a 2"×4" adhesive tape and a 2"×4" polyester Mylar coupon into a 600 gram solution being tested. The solution contained in a 600 mL beaker is placed in a water bath with agitation heated to the desired temperature. After 30 minutes of immersion, the tape and Mylar™ coupon were removed from the solution and pressed under a standard pressure. A tensile test instrument is then used to measure the force required to pull the two apart. A reduction in the force required indicates that the stickies has been detackified. The % detackification is calculated by the following equation:

$$\% \text{ detackification} = \{[(\text{untreated force}) - (\text{treated force})]/(\text{untreated force})\} \times 100$$

Lignin solution samples prepared under different conditions and lignin types used in the studies are summarized in Table 1. The lignin raw materials are not sulfonated lignin derivatives, and not totally soluble in water at pH<9. As defined above, all lignin solution samples, tested at 0.01 wt % concentration, have particle concentrations less than 85 kcps. Since lignin is in soluble form, no particles are formed in water. Therefore, very few particle size can be detected. Samples LS-2 and LS-8 show some particle sizes because of impurities or dust particles present in these samples. The characteristics of extremely low particle concentrations indicate that they are lignin solutions.

Table 2, lists lignin dispersion samples made under different manufacturing process conditions with various lignin resources. All of these lignin dispersion samples, tested at 0.01 wt % concentration, have mean particle sizes and concentrations greater than 40 nanometer (nm) and 85 kilo counts per second (kcps) respectively. It is clear that the lignin dispersion consists of lignin particles with a size range of from about 30 nm to about 20 microns, and can be in the range of about 50 nm to about 10 microns.

TABLE 1

Lignin solution samples made from various lignin resources

| Lignin Solution Sample # | Solids (%) | Particle Size (nm) | Particle Concentration (kcps) | pH | Lignin Raw Material | % Detackification @ 2 ppm | % Detackification @ 5 ppm |
|---|---|---|---|---|---|---|---|
| DeTac ™ DC779F (benchmark) | 15 | — | — | 7.0 | — | 73.5 | 86.4 |
| LS-1 | 3.0 | 0 | 16 | 11.3 | Domtar BioChoice ™ Lot 10 | 53.0 | 62.3 |
| LS-2 | 3.0 | 272 | 11 | 9.9 | Domtar BioChoice ™ Lot 10 | 55.0 | 58.1 |
| LS-3 | 6.3 | 0 | 2.1 | 12.0 | Lignin from FP Innovations (Mill A-AR) | 51.4 | 67.2 |
| LS-4 | 5.4 | 0 | 1.7 | 12.0 | Lignin from FP Innovations (AF mill A) | 48.0 | 59.0 |
| LS-5 | 6.6 | 0 | 1.8 | 12.0 | Lignin from FP Innovations (AF mill B) | 29.8 | 65.5 |
| LS-6 | 6.7 | 0 | 2.2 | 12.0 | Domtar BioChoice ™ Lot 28 | 32.0 | 54.4 |
| LS-7 | 6.2 | 0 | 1.8 | 12.0 | Domtar BioChoice ™ Lot 111 | 26.6 | 39.1 |
| LS-8 | 6.9 | 373 | 3.9 | 12.0 | Low soft pt. lignin from wheat straw (Ptotobind 2400) | 31.4 | 55.2 |
| LS-9 | 5.7 | 0 | 1.8 | 12.0 | Domtar BioChoice ™ Lot 45 | 44.8 | 55.7 |
| LS-10 | 6.6 | 744 | 18 | 12.0 | Low soft pt. lignin from wheat straw (Ptotobind 1000) | 49.3 | 67.5 |

TABLE 2

Lignin dispersion samples made from various lignin raw materials and processes

| Lignin Dispersion sample # | Base | Solids | Mean Particle Size (nm) | Particle Conc. (kcps) | pH | Remarks | Lignin Raw Material |
|---|---|---|---|---|---|---|---|
| LD #1 | $Na_2CO_3$ | 22.3% | 100 | 256 | 8.1 | Sodium | Domtar lot 111 |
| LD #2 | $Na_2CO_3$ | 22.5% | 116 | 226 | 8.1 | carbonate | Domtar lot 111 |
| LD #3 | $Na_2CO_3$ | 22.1% | 2600 | 336 | 7.8 | base of choice | Domtar lot 111 |
| LD #4 | $NH_4OH$ | 22.3% | 179 | 355 | 9.4 | Different base. High base add'n. High pH | Domtar lot 10 |
| LD #5 | $N(EtOH)_3$ | 18.0% | 310 | 304 | 8.6 | Different base. High base add'n. | Domtar lot 10 |
| LD #6 | $K_2CO_3$ | 25.5% | 199 | 433 | 7.4 | Different levels | Domtar lot 10 |
| LD #7 | $K_2CO_3$ | 25.0% | 199 | 487 | 8.5 | of base to get same PS. Lg vs. sm scale prep. | Domtar lot 10 |
| LD #8 | $K_2CO_3$ | 17.1% | 9000 | 288 | 7.4 | High Soft pt | Protobind 1000 |
| LD #9 | $K_2CO_3$ | 22.3% | 4700 | 320 | 8.8 | lignin from wheat straw. Large PS | Wheat Straw |

TABLE 2-continued

Lignin dispersion samples made from various lignin raw materials and processes

| Lignin Dispersion sample # | Base | Solids | Mean Particle Size (nm) | Particle Conc. (kcps) | pH | Remarks | Lignin Raw Material |
|---|---|---|---|---|---|---|---|
| LD #10 | K₂CO₃ | 22.3% | 8900 | 383 | 7.0 | Low Soft pt lignin from wheat straw. Large PS | Protobind 2400 Wheat Straw |
| LD #11 | K₂CO₃ | 22.1% | 270 | 441 | 7.3 | | |
| LD #12 | K₂CO₃ | 23.3% | 2400 | 352 | 8.0 | Lignin from LignoForce™ process from FP Innovations | FP Innovations |
| LD #13 | K₂CO₃ | 23.1% | 181 | 391 | 7.7 | Different lot of BioChoice ™ lignin | Domtar Lot 111 |
| LD #14 | K₂CO₃ | 23.1% | 98 | 344 | 8.4 | | |
| LD #15 | K₂CO₃ | 18.0% | 575 | 445 | 8.7 | Kraft lignin precursor used to make SLS | MeadWestvaco Indulin AT |
| LD #16 | K₂CO₃ | 21.2% | 171 | 267 | 8.8 | Adjusted the pH to @ 6.9 at 55° C. Held for 5 min, then heated to 93° C./held for 5 min, followed by adding ambient DI water for the final dilution. Mixed w/2 impellers. | Domtar Lot 111 |
| LD #17 | K₂CO₃ | 22.3% | 184 | 432 | 7.7 | Adjusted the pH to @ 7.1 at 55° C. Held for 5 min, then heated to 93° C./held for 5 min, followed by adding ambient DI water for the final dilution. Mixed w/2 impellers. | Domtar Lot 111 |
| LD #18 | K₂CO₃ | 22.3% | 160 | 329 | 7.9 | Adjusted the pH to @ 7.1 at 55° C., held for 30 min,, then heated to 93° C./held for 5 min, followed by adding ambient DI water for the final dilution. Mixed w/2 impellers. | Domtar Lot 111 |
| LD #19 | K₂CO₃ | 22.3% | 150 | 319 | 8.0 | Adjusted the pH to @ 7.2 at 55 ° C., then heated to 93° C./held for 5 min, followed by adding ambient DI water for the final dilution. Mixed w/2 impellers. | Domtar Lot 111 |
| LD #20 | K₂CO₃ | 22.1% | 130 | 358 | 8.1 | Adjusted the pH to @ 7.52 at 55° C., held for 5 min, then heated to 93° C./held for 5 min, followed by adding ambient DI water for the final dilution. Mixed w/2 impellers. | Domtar Lot 111 |
| LD #21 | K₂CO₃ | 22.1% | 187 | 364 | 73 | Verify that sodium carbonate NL not method of choice. 1-L scale NL from sodium carbonate. | Domtar Lot 111 |

TABLE 2-continued

Lignin dispersion samples made from various lignin raw materials and processes

| Lignin Dispersion sample # | Base | Solids | Mean Particle Size (nm) | Particle Conc. (kcps) | pH | Remarks | Lignin Raw Material |
|---|---|---|---|---|---|---|---|
| LD #22 | $K_2CO_3$ | 22.3% | 86 | 180 | 8.2 | | |
| LD #23 | $K_2CO_3$ | 21.5 | 104 | 173 | 7.8 | | |
| LD #24 | $K_2CO_3$ | 19.9 | 105 | 311 | 7.1 | | |
| LD #25 | $K_2CO_3$ | 23.2 | 119 | 478 | 7.3 | | |
| LD #26 | $K_2CO_3$ | 22.3 | 141 | 397 | 7.9 | | |
| LD #27 | $K_2CO_3$ | 21.9 | 164 | 342 | 7.8 | | |
| LD #28 | $K_2CO_3$ | 22.9 | 229 | 470 | 7.5 | | |
| LD #29 | $K_2CO_3$ | 19.7 | 375 | 412 | 8.5 | | |
| LD #30 | $K_2CO_3$ | 20.2 | 400 | 343 | 7.8 | | |

The force reductions (i.e., % detackification) for the treated samples with lignin solutions and dispersions are summarized in Tables 3 and 4. Comparing with lignosulfonate (Lignosol™XD), lignin dispersions and solutions are better detackifiers. Generally speaking, lignin dispersion performed better than lignin solution.

TABLE 3

Effect of lignin solutions on detackification of adhesive tape

| Lignin Solution Sample # | % Detackification @ 2 ppm | % Detackification @ 5 ppm |
|---|---|---|
| DeTac ™ DC779F (benchmark) | 73.5 | 86.4 |
| Sodium lignosulfonate (Lignosol ™ XD) | 23.5 | 25.2 |
| LS-1 | 53.0 | 72.3 |
| LS-2 | 55.0 | 58.1 |
| LS-3 | 51.4 | 67.2 |
| LS-4 | 48.0 | 59.0 |
| LS-5 | 29.8 | 65.5 |
| LS-6 | 32.0 | 54.4 |
| LS-7 | 26.6 | 39.1 |
| LS-8 | 31.4 | 55.2 |
| LS-9 | 44.8 | 55.7 |
| LS-10 | 49.3 | 67.5 |

TABLE 4

Effect of lignin dispersions on detackification of adhesive tape

| Lignin Dispersion Sample # | % Detackification @ 2 ppm | % Detackification @ 5 ppm |
|---|---|---|
| DeTac ™ DC779F (benchmark) | 73.5 | 86.4 |
| Sodium lignosulfonate (Lignosol ™ XD) | 23.5 | 25.2 |
| LD #1 | 47.0 | 54.0 |
| LD #2 | 49.4 | 57.3 |
| LD #3 | 59.4 | 63.8 |
| LD #4 | 50.9 | 66.2 |
| LD #5 | 64.7 | 73.6 |
| LD #6 | 49.5 | 62.5 |
| LD #7 | 46.4 | 56.6 |
| LD #8 | 62.1 | 75.8 |
| LD #9 | 54.1 | 75.3 |
| LD #10 | 63.6 | 73.7 |
| LD #11 | 66.8 | 70.1 |
| LD #12 | 67.1 | 74.9 |
| LD #13 | 52.7 | 74.8 |
| LD #14 | 66.2 | 81.5 |
| LD #15 | 51.9 | 61.5 |
| LD #16 | 63.7 | 74.3 |
| LD #17 | 55.6 | 75.3 |
| LD #18 | 73.3 | 92.6 |
| LD #19 | 53.1 | 64.4 |
| LD #20 | 69.1 | 80.5 |
| LD #21 | 57.3 | 65.4 |

Surprisingly, a combination of the lignin solution and DeTac™ DC779F, shows a synergistic effect, as summarized in Table 5. Similar phenomena were observed for combining lignin dispersion and DeTac™ DC779F, as shown in Table 6. It is clear that a superior performance can be obtained by combining lignin solution (or lignin dispersion) with DeTac™ DC779F.

TABLE 5

Effect of lignin solution/DeTac ™ DC779F blends on detackification of adhesive tape

| Sample # | % Detackification @ 2 ppm (no blend) | % Detackification @ 2 ppm (2:1 blend)* | % Detackification @ 2 ppm (3:1 blend)* | % Detackification @ 2 ppm (4:1 blend)* |
|---|---|---|---|---|
| DeTac ™ DC779F | 73.5 | — | — | — |
| LS-1 | 53.0 | 92.4 | 90.0 | 89.3 |
| LS-2 | 55.0 | 94.6 | 87.3 | 85.4 |

TABLE 5-continued

Effect of lignin solution/DeTac™ DC779F blends on detackification of adhesive tape

| | % Detackification @ 10 ppm (no blend) | % Detackification @ 10 ppm (2:1 blend)* | % Detackification @ 10 ppm (3:1 blend)* | % Detackification @ 10 ppm (4:1 blend)* |
|---|---|---|---|---|
| DeTac™ DC779F | 90.2 | — | — | — |
| LS-1 | 72.3 | 97.1 | 100 | 96.8 |
| LS-2 | 58.1 | 97.6 | 95.9 | 97.3 |

*Note:
2:1 blend means 2 parts LS-1 (or LS-2) and 1 part DC779F; same definition for 3:1 and 4:1

TABLE 6

Effect of lignin dispersion/DeTac ® DC779F blends on detackification of adhesive tape

| Sample # | % Detackification @ 2 ppm (No blend) | % Detackification @ 2 ppm (2:1 blend)* | % Detackification @ 2 ppm (3:1 blend)* | % Detackification @ 2 ppm (4:1 blend)* |
|---|---|---|---|---|
| DeTac™ DC779F | 73.5 | — | — | — |
| LD #22 | 71.9 | 95.6 | 93.2 | 85.6 |
| LD #23 | 54.5 | 91.4 | 91.5 | 88.8 |
| LD #24 | 72.9 | 96.1 | 95.4 | 93.4 |
| LD #25 | 71.1 | 95.1 | 93.7 | 92.9 |
| LD #26 | 70.4 | 96.1 | 95.1 | 93.9 |
| LD #27 | 66.8 | 95.3 | 94.6 | 83.9 |
| LD #28 | 71.9 | 95.1 | 94.6 | 93.9 |
| LD #29 | 62.8 | 93.6 | 92.7 | 90.7 |
| LD #30 | 55.8 | 93.1 | 92.4 | 83.4 |

| | % Detackification @ 10 ppm (no blend) | % Detackification @ 10 ppm (2:1 blend)* | % Detackification @ 10 ppm (3:1 blend)* | % Detackification @ 10 ppm (4:1 blend)* |
|---|---|---|---|---|
| DeTac™ DC779F | 90.2 | — | — | — |
| LD #22 | 79.1 | 97.1 | 96.8 | 94.9 |
| LD #23 | 75.1 | 95.6 | 97.3 | 96.1 |
| LD #24 | 79.8 | 100 | 100 | 98.5 |
| LD #25 | 79.1 | 98.3 | 98.0 | 97.3 |
| LD #26 | 77.6 | 98.8 | 100 | 98.5 |
| LD #27 | 75.3 | 97.1 | 97.1 | 95.4 |
| LD #28 | 78.1 | 100 | 100 | 99.0 |
| LD #29 | 71.3 | 98.8 | 100 | 99.5 |
| LD #30 | 73.8 | 95.9 | 95.9 | 95.1 |

A number of hydrophobically modified water-soluble polymers (HMWSP) have been selected to blend with lignin dispersion to evaluate their effects on adhesive tape detackification. As shown in Table 7, synergistic effect was observed between lignin dispersion and HMWSP-1, HMWSP-2, and HMWSP-3.

TABLE 7

Effect of lignin dispersion/detackifier blends on detackification of adhesive tape

| Ratio of HMWSP:LD #24 | % Detackification (treatment conc. is 2 ppm) | | |
|---|---|---|---|
| | HMWSP-1 | HMWSP-2 | HMWSP-3 |
| 1:0 | 71 | 68.2 | 48.9 |
| 4:1 | 100 | 98 | 74.3 |
| 3:1 | 100 | 96.6 | 73.9 |
| 2:1 | 85.3 | 86.6 | 67.1 |
| 1:1 | 87.4 | 78.5 | 68.1 |
| 1:2 | 93.7 | 92.2 | 74.7 |
| 1:3 | 100 | 100 | 63.5 |
| 1:4 | 100 | 100 | 62.8 |
| 0:1 | 71.7 | 70.4 | 70.2 |

A series of sulfonated lignin samples with varying degrees of sulfonation were evaluated and compared with sodium lignosulfonate (Lignosol™ XD). Table 8 lists slightly sulfonated lignin samples with their physical properties.

TABLE 8

Slightly sulfonated lignin samples and their physical properties

| Sample # | Degree of Sulfonation (Moles/kg) | Site of Sulfonic Acid Group | Weight Average Molecular Weight | Na$_2$SO$_3$ salt content (%) |
|---|---|---|---|---|
| SSL-1 | 3.4 | Aliphatic chain | 3700 | 3.0 |
| SSL-2 | 3.3 | Aliphatic chain | 2900 | 16.0 |
| SSL-3 | 2.0 | Aliphatic chain | 2900 | 9.5 |
| SSL-4 | 1.2 | Aliphatic chain | 2400 | 5.0 |
| SSL-5 | 1.2 | Aliphatic chain | 4700 | 4.8 |
| SSL-6 | 0.7 | Aliphatic chain | 4300 | 3.5 |
| SSL-7 | 0 | — | 2700 | 0 |
| SSL-8 | 1.8 | Aromatic nucleus | 9000 | 2.3 |
| SSL-9 | 1.3 | Aromatic nucleus | 11000 | 2.0 |
| SSL-10 | 0.8 | Aromatic nucleus | 10000 | 0.8 |
| SSL-11 | 0.8 | Aromatic nucleus | 23000 | 0.8 |
| SSL-12 | 0.27 | Aromatic nucleus | — | — |
| SSL-13 | 3.4 | Hybrid | 2000 | 1.0 |
| SSL-14 | 2.9 | Hybrid | 3100 | 3.0 |
| SSL-15 | 2.5 | Hybrid | 6300 | 0.1 |

The degree of sulfonation is a function of the amount of organically bound sulfur present in the product. Organically bound sulfur is calculated from the total sulfur content minus the sum of the amount of sulfur present in the starting lignin and the sulfur present in the free salts. For Lignosol™ XD, the degree of sulfonation is about 4.2 moles sulfur/kg lignin.

As seen in Table 9, the degree of sulfonation has a significant impact on sulfonated lignin performance in detackification. When the sulfonated group is on the aliphatic chain, optimal performance is reached at 0.7 degree of sulfonation, and decreases significantly when the degree of sulfonation is greater than 1.2. For the sulfonated group on the aromatic nucleus, product performance increases until the degree of sulfonation reaches about 0.27 and then decreases gradually after reaching a degree of sulfonation of about 1.3. The performance of SSL-6 and SSL-12 are equivalent to or slightly better than benchmark DeTac™ DC779F and much better than Lignosol™ XD (see Table 3).

TABLE 9

Effect of slightly sulfonated lignin on detackification of adhesive tape

| SSL Sample # | Degree of Sulfonation | % Detackification @ 2 ppm |
|---|---|---|
| Sulfonation site: aliphatic chain | | |
| SSL-7 | 0 | 23.0 |
| SSL-6 | 0.7 | 78.2 |
| SSL-4 | 1.2 | 59.9 |
| SSL-3 | 2.0 | 45.1 |
| SSL-1 | 3.4 | 25.3 |
| Lignosol ™ XD | 4.2 | 23.5 |
| Sulfonation site: aromatic nucleus | | |
| SSL-7 | 0 | 23.0 |
| SSL-12 | 0.27 | 70.3 |
| SSL-10 | 0.8 | 60.8 |
| SSL-9 | 1.3 | 54.2 |
| SSL-8 | 1.8 | 56.6 |

TABLE 9-continued

Effect of slightly sulfonated lignin on detackification of adhesive tape

| SSL Sample # | Degree of Sulfonation | % Detackification @ 2 ppm |
|---|---|---|
| Sulfonation site: Hybrid | | |
| SSL-7 | 0 | 23.0 |
| SSL-15 | 2.5 | 56.1 |
| SSL-14 | 2.9 | 52.4 |
| SSL-13 | 3.4 | 48.4 |

Surprisingly, synergistic effect can be obtained by blending lignins having aromatic-sulfonation with varying degrees of sulfonation, as summarized in Table 10. For instance, SSL-12 blended with either SSL-8 or SSL-9 shows synergistic effect.

TABLE 10

Synergistic effect of blending lignins with differing degrees of sulfonation

| | % Detackification @ 2 ppm | | | | |
|---|---|---|---|---|---|
| Slightly Sulfonated Lignin | 1:0 | 1:1 | 3:1 | 1:3 | 0:1 |
| | Ratio of SSL-6:Slightly Sulfonated Lignin (aliphatic sulfonation) | | | | |
| SSL-4 | 78.2 | 73.3 | 70.8 | 55.1 | 59.9 |
| SSL-3 | 78.2 | 60.6 | 63.3 | 59.4 | 45.1 |
| SSL-2 | 78.2 | 65.6 | 47.4 | 55.1 | 58.9 |
| | Ratio of SSL-12:Slightly Sulfonated Lignin (aromatic sulfonation) | | | | |
| SSL-8 | 70.3 | 81.8 | 80.8 | 75.3 | 56.6 |
| SSL-9 | 70.3 | 74.1 | 75.1 | 72.3 | 54.2 |
| SSL-10 | 70.3 | 70.1 | 75.1 | 70.6 | 60.8 |
| | Ratio of SSL-6:Slightly Sulfonated Lignin (aromatic sulfonation) | | | | |
| SSL-8 | 78.2 | 68.6 | 73.3 | 55.4 | 56.6 |
| SSL-9 | 78.2 | 59.1 | 73.6 | 61.9 | 54.2 |
| SSL-10 | 78.2 | 63.8 | 70.1 | 70.3 | 60.8 |

Example 3

Standard Wire Passivation Test

A standard wire passivation test was done using a Mylar™ coupon to represent paper machine wire, and an adhesive tape to represent resinous and tacky substances in papermaking systems. Mylar™ was chosen because its surface energy and surface properties are known to be similar to that of nylon, which is a common component of papermaking forming wire and felts. Mylar™ is also related in behavior to other surfaces like polyethylene and rubber used for Uhle box covers and rolls.

In this test, a Mylar™ coupon was submerged into deionized water or an artificial white water (AWW) containing approximately 300 parts per million (ppm) to about 400 ppm of abietic acid, 50 ppm to 100 ppm of oleic acid, and 400 ppm to 600 ppm of lignin sulfonate. In the water, a given concentration of the testing materials was added and continued to mix for 5 minutes. After treatment, the Mylar™ coupon was removed from the water and attached to the adhesive tape. Then a peel force tester was employed to measure the peel force that was required to separate the tape from the Mylar™ coupon. The peel force thus measured was correlated to the tendency of resinous and tacky substances to deposit on paper forming wire on a papermaking machine. This test method is considered to be a simulation of wire passivation since only polyester coupons were treated. The lower the peel force the lower the tendency that resinous and tacky substances will deposit on paper forming wire and vice versa.

The force reductions for the treated Mylar coupons with lignin dispersions are summarized in Table 11. Comparing to lignosulfonate (Lignosol™ XD), lignin dispersions are better wire passivation agents. All tested lignin dispersion products show comparable performance as benchmark DeTac™ DC779F (HMWSP-4). A combination of lignin dispersion and DeTac™ DC779F (see Table 12) provides either synergistic effect (for example, LD#8 and DeTac™ DC779F blend) or equivalent performance as DeTac™ DC779F alone.

TABLE 11

Effect of lignin dispersions on wire passivation

| Lignin Dispersion Sample # | % Force Reduction @ 2 ppm | % Force Reduction @ 5 ppm |
|---|---|---|
| DeTac ™ DC779F (benchmark) | 44.0 | 58.5 |
| Sodium lignosulfonate (Lignosol ™ XD) | 25.3 | 45.8 |
| LD #1 | 48.2 | 68.3 |
| LD #2 | 51.1 | 67.0 |
| LD #3 | 52.9 | 70.4 |
| LD #4 | 50.2 | 66.8 |
| LD #5 | 57.7 | 75.7 |
| LD #6 | 48.6 | 53.9 |
| LD #7 | 43.4 | 56.2 |
| LD #8 | 59.3 | 56.9 |
| LD #9 | 53.2 | 66.0 |
| LD #10 | 56.2 | 69.4 |
| LD #11 | 61.0 | 69.9 |
| LD #12 | 57.9 | 71.8 |
| LD #13 | 47.4 | 55.9 |
| LD #14 | 55.6 | 71.7 |
| LD #15 | 54.4 | 58.8 |
| LD #16 | 61.7 | 84.5 |
| LD #17 | 58.5 | 69.5 |
| LD #18 | 68.1 | 88.6 |
| LD #19 | 54.2 | 73.4 |
| LD #20 | 62.6 | 87.9 |
| LD #21 | 60.8 | 76.3 |

TABLE 12

Effect of DeTac ® DC779F/lignin dispersion blends on wire passivation

| | % Force Reduction | | | |
|---|---|---|---|---|
| | Treatment conc. = | Ratio of DC779F:Lignin Dispersion (treatment conc. = 2 ppm) | | |
| | 2 ppm | 1:1 | 1:2 | 1:3 |
| DeTac ™ DC779F | 72.6 | | | |
| LD #10 | 64.4 | 75.1 | 72.4 | 67.1 |
| LD #12 | 67.8 | 76.1 | 72.0 | 69.0 |
| LD #14 | 66.8 | 76.1 | 72.9 | 71.7 |
| LD #5 | 65.4 | 78.5 | 76.1 | 66.3 |
| LD #8 | 62.9 | 87.3 | 83.9 | 83.4 |
| | Treatment conc. = 5 ppm Lignin Dispersion Alone | Ratio of DC779F:Lignin Dispersion (treatment conc. = 5 ppm) | | |
| | | 1:1 | 1:2 | 1:3 |

TABLE 12-continued

Effect of DeTac ® DC779F/lignin dispersion blends on wire passivation

| DeTac ™ DC779F | 86.3 | | | |
|---|---|---|---|---|
| LD #10 | 73.7 | 83.2 | 80.7 | 78.1 |
| LD #12 | 74.9 | 79.3 | 78.1 | 75.4 |
| LD #14 | 81.5 | 83.7 | 82.9 | 82.0 |
| LD #5 | 73.4 | 72.7 | 72.9 | 73.2 |
| LD #8 | 75.6 | 78.8 | 76.3 | 76.1 |

Surprisingly, synergistic effect can be obtained by blending lignins having aromatic-sulfonation with differing degrees of sulfonation, as summarized in Table 13. For instance, SSL-12 blended with SSL-8, SSL-9, or SSL-10 shows synergistic effect.

TABLE 13

Synergistic effect of blending lignins with differing degrees of sulfonation

| | % Force Reduction @ 2 ppm | | | | |
|---|---|---|---|---|---|
| Slightly Sulfonated Lignin | 1:0 | 1:1 | 3:1 | 1:3 | 0:1 |
| | Ratio of SSL-6:Slightly Sulfonated Lignin (aliphatic sulfonation) | | | | |
| SSL-4 | 63.4 | 72.4 | 69.2 | 55.3 | 34.0 |
| SSL-3 | 63.4 | 59.9 | 56.7 | 44.0 | 4.8 |
| SSL-2 | 63.4 | 64.1 | 54.5 | 52.8 | 23.3 |
| | Ratio of SSL-12:Slightly Sulfonated Lignin (aromatic sulfonation) | | | | |
| SSL-8 | 46.2 | 74.9 | 74.2 | 70.7 | 54.5 |
| SSL-9 | 46.2 | 60.8 | 63.6 | 67.4 | 44.4 |
| SSL-10 | 46.2 | 66.0 | 71.6 | 71.8 | 56.8 |
| | Ratio of SSL-6:Slightly Sulfonated Lignin (aromatic sulfonation) | | | | |
| SSL-8 | 63.4 | 60.6 | 68.5 | 52.8 | 54.5 |
| SSL-9 | 63.4 | 53.1 | 67.6 | 54.5 | 44.4 |
| SSL-10 | 63.4 | 55.9 | 58.5 | 66.7 | 56.8 |

Example 4

Contaminant Image Analysis (CIA) Test

A novel monitoring device, which employs an image analysis technique to quantitatively measure the amount of stickies deposited onto a hydrophobic surface, was developed to evaluate the effectiveness of inventive compositions on preventing and/or inhibiting the deposition of organic contaminants from pulp on the surfaces of papermaking machinery. The test method disclosed in the U.S. Pat. No. 8,160,305 B2, hereby incorporated by reference in its entirety, was used to demonstrate product performance.

Deposition testing was performed under a given condition, and then the hydrophobic surface was removed, rinsed with deionized water, and allowed to air dry. The image of deposited contaminant particles was analyzed for % AOI (area of interest covered by stickies) by an optical scanner and computer software. Test results indicate the tendency of stickies to deposit on paper machine surfaces. A lower % AOI reading means better stickies control in the papermaking process. As shown in Table 14, all tested lignin solutions effectively reduced stickies deposition compared to the lignosulfonate. Their performances were slightly better than or equivalent to the benchmark DeTac® DC779F. Lignin dispersion products essentially showed the same trend (Table 15) as lignin solutions (Table 14).

TABLE 14

Effect of lignin solutions on stickies deposition

| Lignin Dispersion Sample # | % AOI Reduction @ 2 ppm | % AOI Reduction @ 5 ppm |
|---|---|---|
| DeTac ® DC779F (benchmark) | 54.2 | 87.2 |
| Sodium lignosulfonate (Lignosol XD) | 30.8 | 42.6 |
| LS #3 | — | 84.5 |
| LS #5 | — | 91.7 |
| LS #6 | — | 95.2 |
| LS #7 | 80.8 | 81.3 |
| LS #10 | 56.2 | 91.6 |

TABLE 15

Effect of lignin dispersions on stickies deposition

| Lignin Dispersion Sample # | % AOI Reduction @ 2 ppm | % AOI Reduction @ 5 ppm |
|---|---|---|
| DeTac ™ DC779F (benchmark) | 54.2 | 87.2 |
| Sodium lignosulfonate (Lignosol ™ XD) | 30.8 | 42.6 |
| LD #1 | — | 82.1 |
| LD #2 | — | 61.8 |
| LD #3 | — | 72.2 |
| LD #4 | — | 92.5 |
| LD #5 | 58.7 | 92.8 |
| LD #6 | — | 65.0 |
| LD #7 | 83.4 | 77.2 |
| LD #8 | 38.3 | 74.5 |
| LD #9 | — | 86.6 |
| LD #12 | 45.7 | 88.9 |
| LD #13 | — | 69.0 |
| LD #14 | 70.5 | 93.8 |
| LD #15 | — | 90.4 |
| LD #16 | — | 71.3 |
| LD #17 | — | 75.3 |
| LD #18 | — | 90.5 |
| LD #19 | — | 90.3 |
| LD #20 | — | 84.6 |
| LD #21 | — | 65.7 |
| LD #26 | — | 74.8 |
| LD #27 | — | 83.4 |
| LD #29 | — | 79.6 |

While this invention has been described with respect to particular embodiments thereof, it is apparent that numerous other forms and modifications of this invention will be obvious to those skilled in the art. The appended claims and this invention generally should be construed to cover all such obvious foams and modifications which are within the true spirit and scope of the present invention.

What is claimed is:

1. A method of preventing and/or inhibiting the deposition of organic contaminants on surfaces in pulp and papermaking systems comprising:
    adding to the pulp and papermaking system a composition comprising one or more nonsulfonated lignins, and one or more non-ionic hydrophobically modified water-soluble polymers chosen from modified hydroxyethylcellulose, modified water-soluble methyl cellulose, and polyvinyl alcohol having from about 50% to about 99% hydrolysis, or combinations thereof, wherein the non-sulfonated lignins and the non-ionic hydrophobically modified water-soluble polymers are present in a weight ratio of from about 1:4 to about 4:1.

2. The method of claim 1, wherein the composition further comprises sulfonated lignins having a degree of sulfonation of less than 3.5 moles of sulfur per kilogram of lignin.

3. The method according to claim 1, wherein the non-sulfonated lignins are present as a dispersion and the dispersion comprises lignin particles having an average particle size of about 105 nm.

4. The composition according to claim 1, further comprising one or more anionic polymers selected from the group consisting of copolymer of DADMAC and acrylic acid salts, polymer with (chloromethyl) oxirane, polyacrylates, diisobutylene-hydrolyzed maleic anhydride copolymers, ethyl vinyl ether/maleic anhydride copolymers, polyacrylamides, polymethylmethacrylate and combinations thereof.

5. The method according to claim 1, further comprising one or more cationically charged compounds selected from the group consisting of cationic surfactants, cationic polymers, and polyvalent metal ions.

6. The method according claim 1, wherein the amount of composition added to the pulp and papermaking system is from about 0.005% to about 5.0% based on dry weight pulp.

7. The method according to claim 1, wherein the amount of composition added to the pulp and papermaking system is from about 0.01% to about 1.0% based on dry weight pulp.

8. A method of preventing and/or inhibiting the deposition of contaminants on the surfaces of pulp and papermaking systems comprising spraying on the surfaces a composition comprising one or more non-sulfonated lignins and one or more non-ionic hydrophobically modified water-soluble polymers chosen from modified hydroxyethylcellulose, modified water water-soluble methyl cellulose, and polyvinyl alcohol having from about 50% to about 99% hydrolysis or combinations thereof, wherein the non-sulfonated lignin and the non-ionic hydrophobically modified water-soluble polymers are present in the composition in a weight ratio of from about 1:4 to about 4:1.

9. The method according to claim 8, wherein the composition further comprises sulfonated lignins having a degree of sulfonation of less than 3.5 moles of sulfur per kilogram of lignin.

10. The method according to claim 8, wherein the non-sulfonated lignins are present as a dispersion and the lignin dispersion comprises lignin particles having an average particle size of about 105 nm.

11. The method according to claim 8, wherein the composition further comprises one or more cationically charged compounds selected from the group consisting of cationic surfactants, cationic polymers, and polyvalent metal ions.

12. The method according to claim 8, wherein the composition is sprayed onto the surfaces of pulp and papermaking machinery and equipment in an amount ranging from about 0.005% to about 5.0% based on dry weight pulp.

13. A method of preventing and/or inhibiting the deposition of organic contaminants on surfaces in pulp and papermaking systems comprising:
    adding to the pulp and papermaking system a composition comprising a first lignin having a degree of aromatic sulfonation of about 0.3 mols/kg and a second lignin having a degree of aromatic sulfonation of from about 0.8 to about 1.8 mols of sulfur/kg,
    wherein the first lignin and the second lignin are present in a weight ratio of from about 1:3 to about 3:1.

14. The method of claim 13 that produces a detackification percentage of greater than about 70% when utilizing a treatment concentration of about 2 ppm of the first and second lignins and produces a percent force reduction of greater than about 60% when utilizing a treatment concentration of about 2 ppm of the first and second lignins.

15. The method of claim 13 wherein the first lignin and the second lignin are present in a weight ratio of from about 1:3 to about 1:1.

16. The method of claim 13 wherein the first lignin and the second lignin are present in a weight ratio of from about 1:1 to about 3:1.

17. The method according to claim 1, wherein the non-sulfonated lignin and the non-ionic hydrophobically modified water-soluble polymers are present in a weight ratio of about 1:1.

18. The method according to claim 1, wherein the non-sulfonated lignin and the non-ionic hydrophobically modified water-soluble polymers are present in a weight ratio of from about 1:4 to about 1:1.

19. The method according to claim 1, wherein the non-sulfonated lignin and the non-ionic hydrophobically modified water-soluble polymers are present in a weight ratio of from about 1:1 to about 4:1.

20. The method according to claim 1 that produces a detackification percentage of from about 62% to about 100% when utilizing a treatment concentration of about 2 ppm of the non-sulfonated lignin and the non-ionic hydrophobically modified water-soluble polymers.

\* \* \* \* \*